United States Patent
Kale et al.

(10) Patent No.: US 12,210,962 B2
(45) Date of Patent: Jan. 28, 2025

(54) ARTIFICIAL NEURAL NETWORKS ON A DEEP LEARNING ACCELERATOR

(71) Applicant: Micron Technology, Inc., Boise, ID (US)

(72) Inventors: Poorna Kale, Folsom, CA (US); Saideep Tiku, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 883 days.

(21) Appl. No.: 17/364,086

(22) Filed: Jun. 30, 2021

(65) Prior Publication Data
US 2023/0004786 A1 Jan. 5, 2023

(51) Int. Cl.
*G06N 3/063* (2023.01)
*G06F 9/48* (2006.01)
*G06F 9/50* (2006.01)
*G06N 3/045* (2023.01)

(52) U.S. Cl.
CPC .......... *G06N 3/063* (2013.01); *G06F 9/4881* (2013.01); *G06F 9/5038* (2013.01); *G06F 9/5061* (2013.01); *G06N 3/045* (2023.01)

(58) Field of Classification Search
None
See application file for complete search history.

(56) References Cited

U.S. PATENT DOCUMENTS

| | | | |
|---|---|---|---|
| 11,373,119 B1 * | 6/2022 | Doshi | ..................... H04L 47/70 |
| 2016/0232764 A1 | 8/2016 | Galvin | |
| 2018/0039886 A1 * | 2/2018 | Umuroglu | ................ G06N 3/04 |
| 2018/0046894 A1 | 2/2018 | Yao | |
| 2018/0082175 A1 * | 3/2018 | Zhu | ........................ G06F 9/5044 |
| 2018/0107451 A1 * | 4/2018 | Harrer | ...................... G06F 7/483 |
| 2018/0311012 A1 * | 11/2018 | Moctezuma | ......... G06V 10/454 |
| 2018/0341525 A1 * | 11/2018 | Gupta | ................... G06F 9/4881 |
| 2019/0042948 A1 * | 2/2019 | Lee | ........................ G06N 3/063 |
| 2019/0080260 A1 * | 3/2019 | Acuna Agost | ..... G06Q 30/0275 |
| 2019/0080362 A1 * | 3/2019 | Acuna Agost | ..... G06Q 30/0275 |
| 2019/0147344 A1 * | 5/2019 | Zhang | ................... G06N 3/063 |
| | | | 706/25 |
| 2019/0220513 A1 * | 7/2019 | Xin | ........................ G10L 15/22 |
| 2019/0286973 A1 * | 9/2019 | Kovvuri | ................... G06N 3/04 |

(Continued)

FOREIGN PATENT DOCUMENTS

| KR | 10-2217114 | 2/2021 |
|---|---|---|
| KR | 10-2021-0067505 | 6/2021 |

OTHER PUBLICATIONS

Ahmad Shawahna et al., 'FPGA-based Accelerators of Deep Learning Networks for Learning and Classification: A Review', arXiv:1901.00121v1 [cs.NE], Jan. 1, 2019, pp. 1-33.

(Continued)

*Primary Examiner* — Adam Lee
(74) *Attorney, Agent, or Firm* — Brooks, Cameron & Huebsch, PLLC

(57) ABSTRACT

Multiple artificial neural networks can be compiled as a single workload. A respective throughput for each of the artificial neural networks can be changed at runtime. The multiple artificial neural networks can be partially compiled individually and then later compiled just-in-time according to changing throughput demands for the artificial neural networks. The multiple artificial neural networks can be deployed on a deep learning accelerator hardware device.

24 Claims, 6 Drawing Sheets

(56) References Cited

U.S. PATENT DOCUMENTS

| | | | |
|---|---|---|---|
| 2019/0306269 A1* | 10/2019 | Sofia | H04L 67/51 |
| 2019/0325308 A1* | 10/2019 | Chung | G06F 40/216 |
| 2020/0050939 A1* | 2/2020 | Zhu | G06N 3/063 |
| 2020/0082852 A1* | 3/2020 | Golov | G11C 7/22 |
| 2020/0151019 A1* | 5/2020 | Yu | G06F 9/5027 |
| 2020/0184043 A1* | 6/2020 | Li | G06V 10/772 |
| 2020/0193273 A1* | 6/2020 | Chung | G06F 17/16 |
| 2020/0218962 A1* | 7/2020 | Lee | G06N 3/063 |
| 2020/0218982 A1* | 7/2020 | Annau | G06F 7/49963 |
| 2020/0234126 A1* | 7/2020 | Covell | G06F 1/03 |
| 2020/0237229 A1* | 7/2020 | Fei | G01N 21/31 |
| 2020/0250545 A1 | 8/2020 | Verrilli et al. | |
| 2020/0257566 A1* | 8/2020 | Ganguli | H04L 41/5025 |
| 2020/0257960 A1* | 8/2020 | Gabriel | G06N 3/063 |
| 2020/0264876 A1* | 8/2020 | Lo | G06N 3/084 |
| 2020/0265301 A1* | 8/2020 | Burger | G06N 3/084 |
| 2020/0293869 A1* | 9/2020 | Meng | G06N 3/0464 |
| 2020/0301739 A1* | 9/2020 | Xu | G06N 3/063 |
| 2020/0311559 A1* | 10/2020 | Chattopadhyay | G06N 5/01 |
| 2020/0349413 A1* | 11/2020 | Muthusamy | G06N 3/045 |
| 2020/0364088 A1 | 11/2020 | Ashwathnarayan et al. | |
| 2020/0364552 A1* | 11/2020 | Guo | H03M 7/24 |
| 2020/0387799 A1* | 12/2020 | Vivekraja | G06N 3/044 |
| 2021/0004674 A1 | 1/2021 | Lie et al. | |
| 2021/0021461 A1 | 1/2021 | Schwartz et al. | |
| 2021/0034950 A1* | 2/2021 | Xie | G06N 3/045 |
| 2021/0065007 A1* | 3/2021 | Interlandi | G06N 20/20 |
| 2021/0072911 A1* | 3/2021 | Kale | G06F 3/0619 |
| 2021/0073625 A1 | 3/2021 | Cai | |
| 2021/0109796 A1* | 4/2021 | Fozard | G06F 9/48 |
| 2021/0114209 A1* | 4/2021 | Wada | B25J 9/161 |
| 2021/0133577 A1* | 5/2021 | Srinivasan | G06N 20/00 |
| 2021/0136170 A1* | 5/2021 | Katre | H04L 67/565 |
| 2021/0150260 A1* | 5/2021 | Wang | G06F 18/211 |
| 2021/0174214 A1* | 6/2021 | Venkatesan | G06N 3/08 |
| 2021/0201117 A1* | 7/2021 | Ha | G06N 3/045 |
| 2021/0295139 A1* | 9/2021 | Kolhe | G06N 3/045 |
| 2021/0295166 A1* | 9/2021 | Rouhani | G06N 3/045 |
| 2021/0303967 A1* | 9/2021 | Bender | G06N 3/08 |
| 2021/0383191 A1* | 12/2021 | Ainslie | G06N 20/00 |
| 2021/0390405 A1* | 12/2021 | Choi | G06N 3/045 |
| 2022/0019869 A1* | 1/2022 | Li | G06N 3/04 |
| 2022/0027208 A1 | 1/2022 | Kong et al. | |
| 2022/0051093 A1* | 2/2022 | Skaljak | G06T 15/06 |
| 2022/0067526 A1* | 3/2022 | Claussen | G06N 3/045 |
| 2022/0083386 A1* | 3/2022 | Almeida | G06N 5/01 |
| 2022/0108203 A1* | 4/2022 | Mehendale | G06N 3/045 |
| 2022/0123841 A1* | 4/2022 | Frankel | H04B 10/801 |
| 2022/0196414 A1* | 6/2022 | Wang | G05B 13/027 |
| 2022/0229701 A1* | 7/2022 | Zhang | G06F 9/5038 |
| 2022/0230048 A1* | 7/2022 | Li | G06N 3/08 |
| 2022/0301141 A1* | 9/2022 | Shyu | G06T 7/0002 |
| 2022/0318052 A1* | 10/2022 | Sivathanu | G06F 9/505 |
| 2022/0318674 A1* | 10/2022 | Shukla | G06N 20/00 |
| 2022/0383082 A1* | 12/2022 | Zhang | G06N 3/045 |
| 2022/0414437 A1* | 12/2022 | Liu | G06F 12/0802 |
| 2023/0105476 A1* | 4/2023 | Anil | G06N 3/006 718/102 |
| 2023/0267024 A1* | 8/2023 | Cao | G06N 3/063 |
| 2023/0297504 A1* | 9/2023 | Liu | G06F 9/5016 711/200 |
| 2023/0315478 A1* | 10/2023 | Liu | G06N 3/063 712/34 |

OTHER PUBLICATIONS

Mingzhen Li et al., 'The Deep Learning Compiler: A Comprehensive Survey', arXiv:2002.03794v1 [cs.DC], Feb. 6, 2020, pp. 1-32.

* cited by examiner

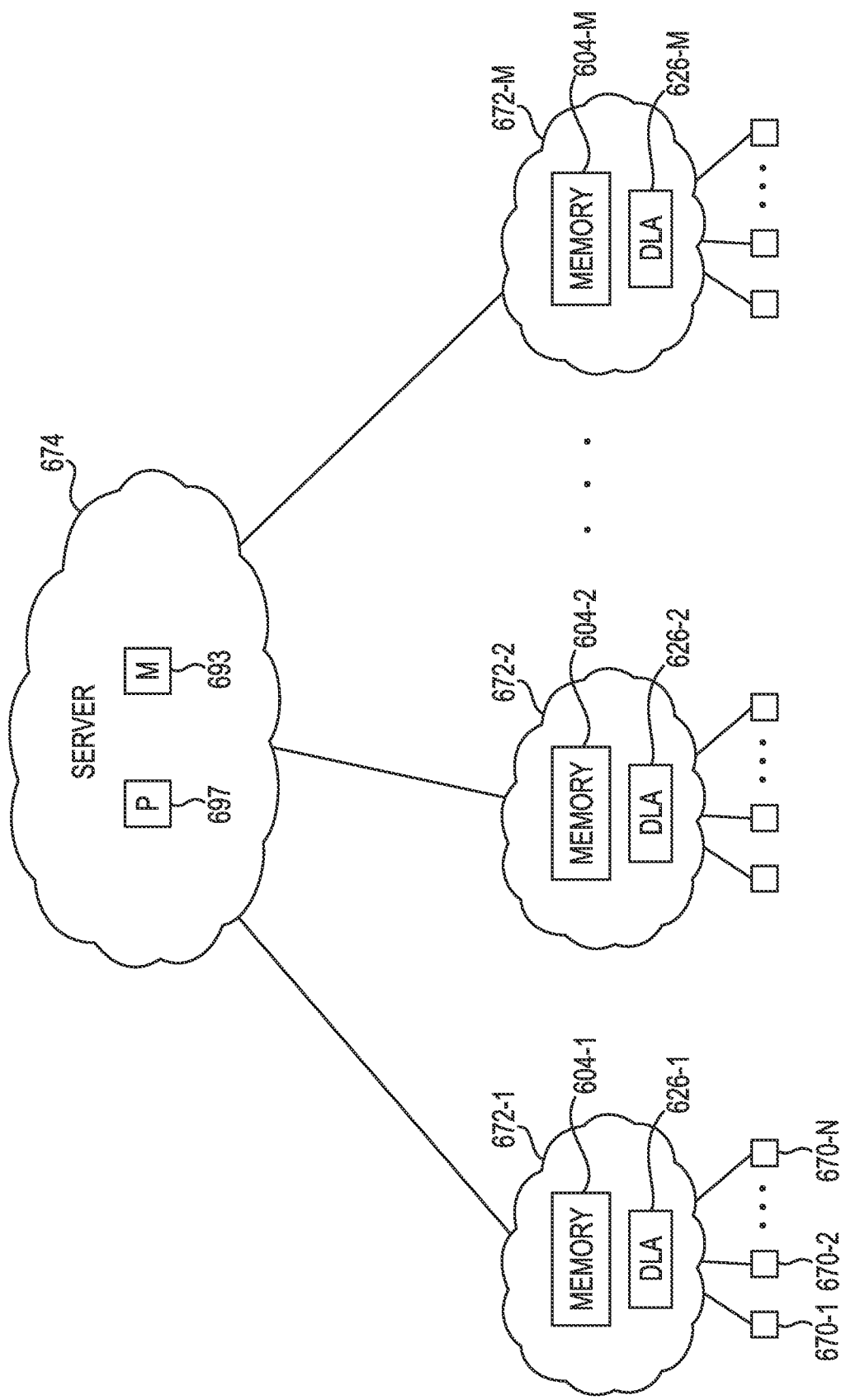

ARTIFICIAL NEURAL NETWORKS ON A DEEP LEARNING ACCELERATOR

TECHNICAL FIELD

The present disclosure relates generally to memory, and more particularly to apparatuses and methods associated with artificial neural networks on a deep learning accelerator.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

BRIEF DESCRIPTION OF THE DRAWINGS

FIG. 6 is a block diagram of a fog computing network in accordance with a number of embodiments of the present disclosure.

DETAILED DESCRIPTION

Figure 1:
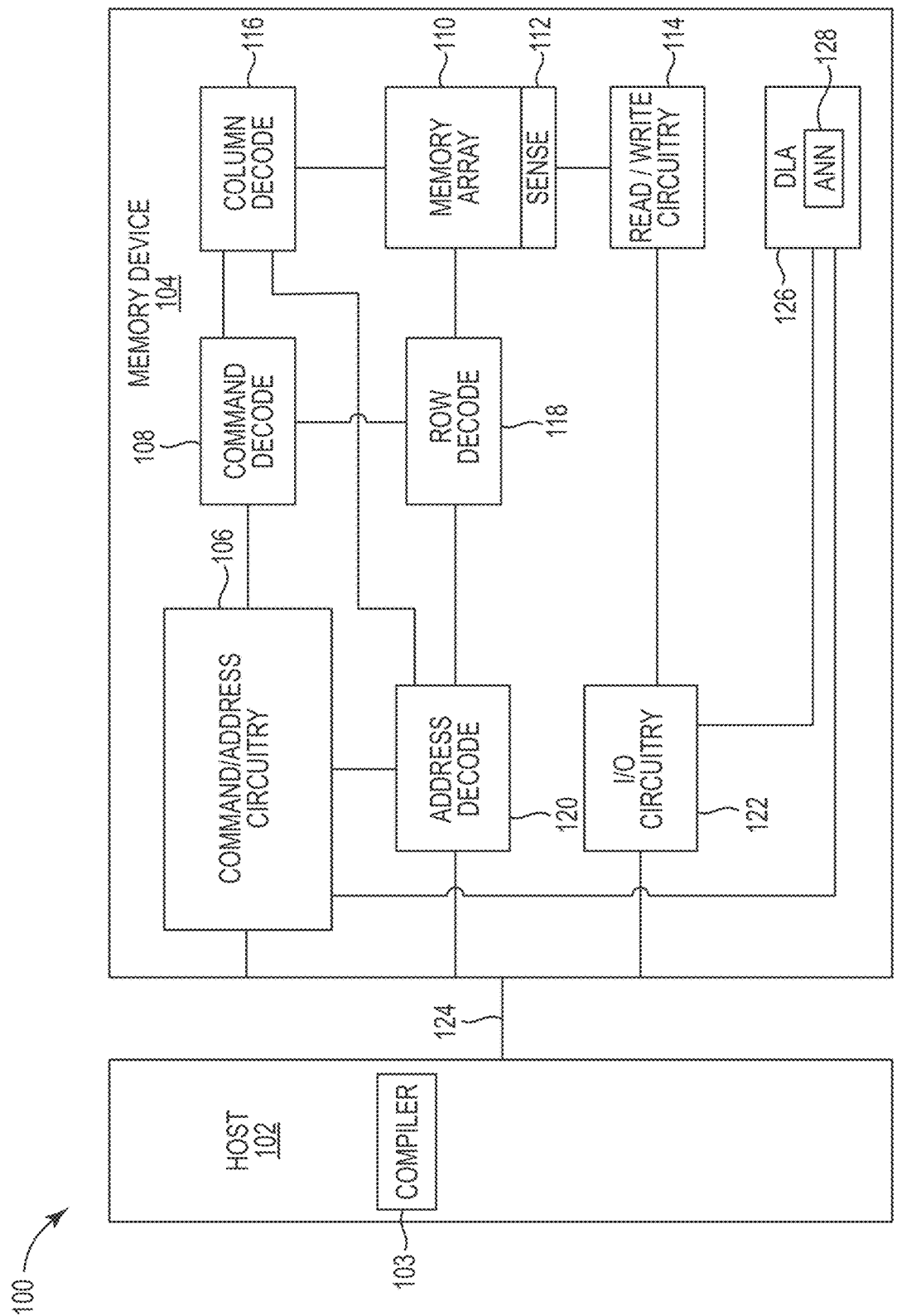
FIG. 1 is a block diagram of an apparatus in the form of a computing system including a memory device in accordance with a number of embodiments of the present disclosure.

The present disclosure includes apparatuses and methods related to artificial neural networks (ANNs) on a deep learning accelerator (DLA). ANN application workloads deployed on edge devices, such as fog computing nodes, can change dramatically due to usage requirements. Under some situations, the compute units available on an edge device might become oversubscribed. Such situations may be addressed with manual or automated load management switching the deployed ANN model based on workload requirements. However, switching between ANN models at runtime may incur overheads such as recompiling ANN models and creating runtime schedules. Such overhead can be detrimental to the overall robustness and the real-time aspects of the ANN applications.

Some DLAs include a vast systolic array of compute units. A vast systolic array is an homogenous network of tightly coupled data accessing units such as multiply and accumulate units (MAC). However, such approaches can be inefficient if the ANNs do not efficiently utilize the large MAC units. Other DLAs include smaller compute units that work in tandem such that an ANN workload is executed through a fixed schedule. The scalable aspect of smaller compute units allows for the execution of multiple ANNs on the same DLA, such as an application specific integrated circuit (ASIC) or field programmable gate array (FPGA). However, each ANN utilizes a fixed set of computing units and a fixed execution schedule. Such a workload strategy is ignorant of changing workloads and user performance requirements.

Aspects of the present disclosure address the above and other deficiencies. For instance, a respective throughput of each ANN deployed on a DLA can be changed at runtime. For example, the change can be made based on data in the input pipeline and/or user-specified values. The change can be made without going through a full recompilation and redeployment of the ANNs on the DLA. In at least one embodiment, multiple ANNs can be co-compiled as a single workload and deployed on the DLA. The compiler can produce several execution schedules for the ANNs on the DLA. Each execution schedule corresponds to a unique distribution of the ANNs across various compute units of the DLA. The execution schedules can employ techniques such as weight sharing and layer fusion between different ANNs. The execution schedules can be stored in a low-level format that can be accessed at runtime. As the throughput requirements of each ANN change (e.g., as specified by a user or workload-dependent), the execution schedule in use can be changed during runtime. In at least one embodiment, data representing the ANNs can be stored in a partially compiled state individually and then combined execution schedules can be created just-in-time as the throughput demand for the ANNs change. "Data representing the ANN" refers to any instructions associated with execution of the ANN and/or data such as weights, biases, etc. associated with the ANN.

An ANN can provide learning by forming probability weight associations between an input and an output. The probability weight associations can be provided by a plurality of nodes that comprise the ANN. The nodes together with weights, biases, and activation functions can be used to generate an output of the ANN based on the input to the ANN. As used herein, artificial intelligence refers to the ability to improve a machine through "learning" such as by storing patterns and/or examples which can be utilized to take actions at a later time. Deep learning refers to a device's ability to learn from data provided as examples. Deep learning can be a subset of artificial intelligence. Artificial neural networks, among other types of networks, can be classified as deep learning.

Fog computing is an architecture that uses edge devices, which are also referred to as nodes, to carry out some or all of the computation and/or storage locally and to communicate at least partially processed data over a network, such as the Internet. Fog computing can be used for surveillance applications. For example, a metropolitan area network can include sensors deployed on infrastructure such as that used for lighting, power transmission, communication, traffic control, etc. The sensors can be used to track automobiles, people, mobile phones, etc. In the fog surveillance application, some of the workload of the overall application can be handled by nodes proximal to the sensors so that that computational workload is distributed throughout the network rather than being bottlenecked at a centralized server.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 126 may reference element "26" in FIG. 1, and a similar element may be referenced as 226 in FIG. 2. Analogous elements within a Figure may be referenced with a hyphen and extra numeral or letter. See, for example, elements 228-1, 228-2 in FIG. 2. Such analogous elements may be generally referenced without the hyphen and extra numeral or letter. For example, elements 228-1 and 228-2 may be collectively referenced as 228. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form of a computing system 100 including a memory device 104 in accordance with a number of embodiments of the present disclosure. The memory device 104 is coupled to a host 102 via an interface 124. As used herein, a host 102, a memory device 104, or a memory array 110, for example, might also be separately considered to be an "apparatus." The interface 124 can pass control, address, data, and other signals between the memory device 104 and the host 102. The interface 124 can include a command bus (e.g., coupled to the command/address circuitry 106), an address bus (e.g., coupled to the command/address circuitry 106), and a data bus (e.g., coupled to the input/output (I/O) circuitry 122). Although the command/address circuitry 106 is illustrated as a single component, embodiments are not so limited, as the command circuitry and address circuitry can be discrete components. In some embodiments, the command bus and the address bus can be comprised of a common command/address bus. In some embodiments, the command bus, the address bus, and the data bus can be part of a common bus. The command bus can pass signals between the host 102 and the command/address circuitry 106 such as clock signals for timing, reset signals, chip selects, parity information, alerts, etc. The address bus can pass signals between the host 102 and the command/address circuitry 106 such as logical addresses of memory banks in the memory array 110 for memory operations. The interface 124 can be a physical interface employing a suitable protocol. Such a protocol may be custom or proprietary, or the interface 124 may employ a standardized protocol, such as Peripheral Component Interconnect Express (PCIe), Gen-Z interconnect, cache coherent interconnect for accelerators (CCIX), etc. In some cases, the command/address circuitry 106 is a register clock driver (RCD), such as RCD employed on an RDIMM or LRDIMM.

The memory device 104 and host 102 can be a fog computing node, a satellite, a communications tower, a personal laptop computer, a desktop computer, a digital camera, a mobile telephone, a memory card reader, an Internet-of-Things (IoT) enabled device, an automobile, among various other types of systems. For clarity, the system 100 has been simplified to focus on features with particular relevance to the present disclosure. The host 102 can include a number of processing resources (e.g., one or more processors, microprocessors, or some other type of controlling circuitry) capable of accessing the memory device 104.

The memory device 104 can provide main memory for the host 102 or can be used as additional memory or storage for the host 102. By way of example, the memory device 104 can be a dual in-line memory module (DIMM) including memory arrays 110 operated as double data rate (DDR) DRAM, such as DDR5, a graphics DDR DRAM, such as GDDR6, or another type of memory system. Embodiments are not limited to a particular type of memory device 104. Other examples of memory arrays 110 include RAM, ROM, SDRAM, LPDRAM, PCRAM, RRAM, flash memory, and three-dimensional cross-point, among others. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The command/address circuitry 106 can decode signals provided by the host 102. The command/address circuitry 106 can also be referred to as a command input and control circuit (or more generally, "control circuitry") and can represent the functionality of different discrete ASICs or portions of different ASICs depending on the implementation. The signals can be commands provided by the host 102. These signals can include chip enable signals, write enable signals, and address latch signals, among others, that are used to control operations performed on the memory array 110. Such operations can include data read operations, data write operations, data erase operations, data move operations, etc. The command/address circuitry 106 can comprise a state machine, a sequencer, and/or some other type of control circuitry, which may be implemented in the form of hardware, firmware, or software, or any combination of the three. The commands can be decoded by command decode circuitry 108 and forwarded to the memory array 110 via column decode circuitry 116 and/or row decode circuitry 118.

Data can be provided to and/or from the memory array 110 via data lines coupling the memory array 110 to input/output (I/O) circuitry 122 via read/write circuitry 114. The I/O circuitry 122 can be used for bi-directional data communication with the host 102 over an interface. The read/write circuitry 114 is used to write data to the memory array 110 or read data from the memory array 110. As an example, the read/write circuitry 114 can comprise various drivers, latch circuitry, etc. In some embodiments, the data path can bypass the command/address circuitry 106.

The memory device 104 includes address decode circuitry 120 to latch address signals provided over an interface. Address signals are received and decoded by address decode circuitry 120 and provided therefrom to row decode circuitry 118 and/or column decode circuitry 116 to access the memory array 110. Data can be read from memory array 110 by sensing voltage and/or current changes on the sense lines using sensing circuitry 112. The sensing circuitry 112 can be coupled to the memory array 110. The sensing circuitry 112 can comprise, for example, sense amplifiers that can read and latch a page (e.g., row) of data from the memory array 110. Sensing (e.g., reading) a bit stored in a memory cell can involve sensing a relatively small voltage difference on a pair of sense lines, which may be referred to as digit lines or data lines.

The memory array 110 can comprise memory cells arranged in rows coupled by access lines (which may be referred to herein as word lines or select lines) and columns coupled by sense lines (which may be referred to herein as digit lines or data lines). Although the memory array 110 is shown as a single memory array, the memory array 110 can represent a plurality of memory arrays arraigned in banks of the memory device 104. The memory array 110 can include a number of memory cells, such as volatile memory cells (e.g., DRAM memory cells, among other types of volatile memory cells) and/or non-volatile memory cells (e.g., RRAM memory cells, among other types of non-volatile memory cells).

The memory device can also include a DLA hardware device 126. The DLA hardware device 126 can be coupled to the command/address circuitry 106 to receive commands therefrom or to provide instructions thereto. The DLA hardware device 126 can be coupled to the I/O circuitry 122 to receive data therefrom or provide data thereto. Such data can be data to be exchanged with the memory array 110 and/or the host 102. Although not specifically illustrated, in some embodiments, the DLA hardware device 126 can be coupled to the memory array 110 for direct exchange of data therewith. The DLA hardware device 126 can be an ASIC, and FPGA, or other hardware component of the memory device 104. As illustrated, the DLA hardware device 126 can have multiple ANNs 128 co-compiled and deployed thereon.

The ANNs 128 can be compiled by a compiler 103 on the host 102. The compiler 103 can be hardware and/or software (executed instructions) that translates instructions (computer code) written in one programming language (a source language) into another language (the target language). In this case, the target language is that of the DLA hardware device 126. For example, the compiler 103 can compile instructions from the host 102 to cause the DLA hardware device 126 to execute one or more ANNs 128 in accordance with the instructions.

The DLA hardware device 126 can be configured to share compute resources between the ANNs 128 deployed thereon according to a first execution schedule accessed from the memory array 110. The DLA hardware device 126 can be configured to share compute resources between the ANNs 128 differently according to a second execution schedule accessed from the memory array 110. Execution schedules are described in more detail below. The DLA hardware device 126 can be configured to share compute resources between the ANNs 128 differently according to any of a plurality of execution schedules accessed from the memory array 110. The DLA hardware device 126 can be configured to share compute resources between the ANNs 128 differently without having the ANNs 128 redeployed on the DLA hardware device 126.

The DLA hardware device 126 can be configured to prefetch weights associated with a second ANN 128 from the memory array 110 while executing a first ANN 128. The DLA hardware device 126 can be configured to prefect the weights according to an upcoming context switch from the first ANN 128 to the second ANN 128 as indicated by the first execution schedule. For example, the first execution schedule may indicate that a portion of time dedicated to execution of the first ANN is about to elapse. The DLA hardware device 126 can prefetch the weights based on a time remaining in the first execution schedule and a time required to prefect the weights such that the weights are received prior to the context switch. Context switching is described in more detail with respect to FIG. 2.

Figure 2:
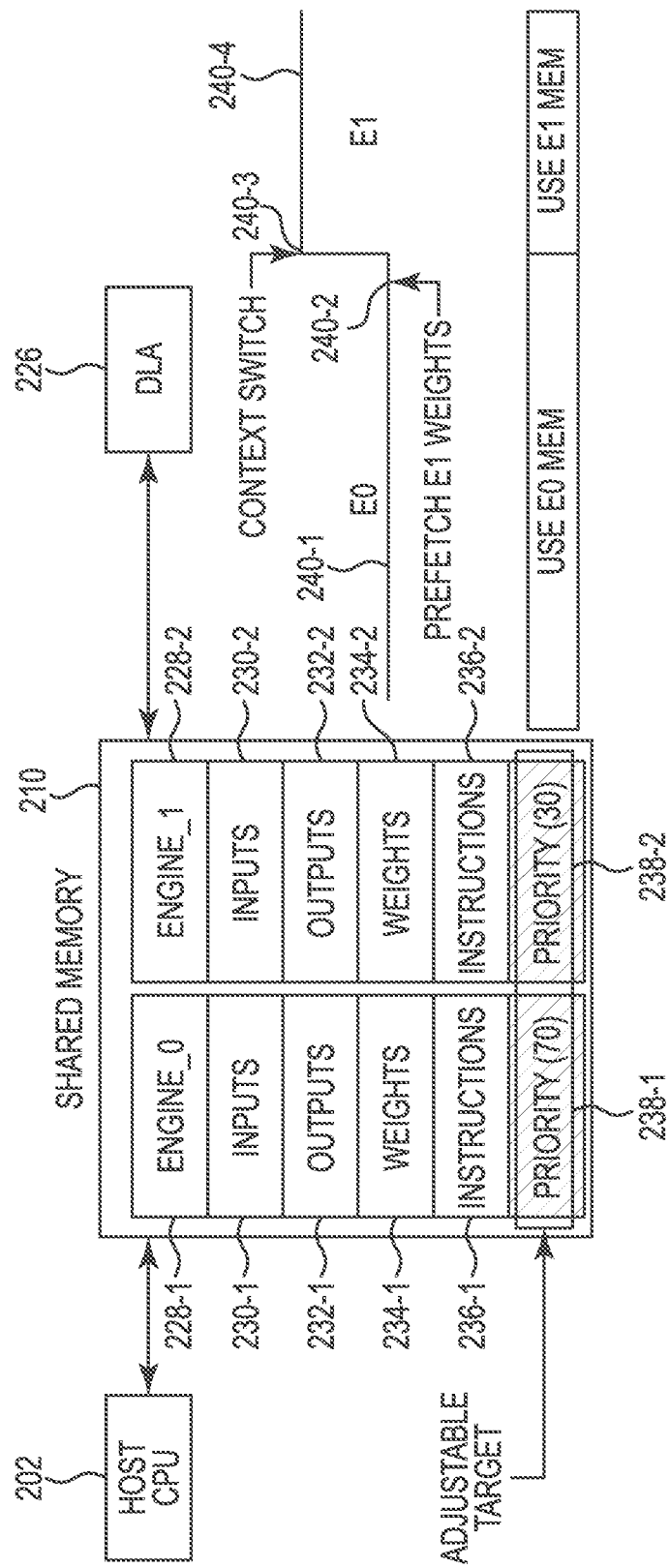
FIG. 2 is a block diagram of a computing system illustrating switching between different artificial neural networks deployed on a deep learning accelerator in accordance with a number of embodiments of the present disclosure.

FIG. 2 is a block diagram of a computing system illustrating switching between different artificial neural networks deployed on a deep learning accelerator in accordance with a number of embodiments of the present disclosure. The system includes a host (Host CPU) 202 coupled to memory (Shared Memory) 210, which is coupled to a DLA 226. The memory 210 is illustrated as storing two engines (Engine_0 and Engine_1), which represent a first ANN 228-1 and a second ANN 228-2. Each ANN 228 is associated with respective inputs 230-1, 230-2, outputs 232-1, 232-2, weights 234-1, 234-2, instructions 236-1, 236-2, and priority information 238-1, 238-2.

An individual ANN 228 can receive input data 230 and can generate an output 232, which can be referred to as a predicted output because it is a prediction of the result of the classification, identification, or analysis performed on the input data 230 by the ANN 228. An example of the output 232 is an identification of an object in an image, where the image is the input data 230. The ANN 228 can include layers of nodes including an initial or input layer and a final or output layer with intermediate layers therebetween. The input data 230 can be input to the nodes of the input layer. The nodes of the output layer can provide signals that represent the output 232 of the ANN 228.

Each node of the ANN 228 can be coupled to adjacent nodes. Signals can be provided from the nodes of a previous layer to connected nodes of a subsequent layer. The connection between adjacent nodes can be assigned a weight 234. In some embodiments, each connection in the ANN 228 can have an individual weight 234 assigned thereto. A topology of the ANN 228 describes the coupling of the nodes. The topology of the ANN 228 also describes the quantity of nodes. The topology of the ANN 228 further describes the layers of the ANN 228.

A node can provide (or not provide) an input signal to each of the nodes to which it is coupled. For a given pair of coupled nodes, that signal can be combined with a weight assigned to the connection therebetween. For example, the weight can be multiplied with the signal provided from a first node to the second node. A given node can have a quantity of inputs thereto from a corresponding quantity of nodes coupled thereto. The node can sum the product of the signals input thereto and the corresponding weights assigned to the connections. A bias can be added to the sum. The addition (e.g., sum of the bias and the sum of the product of the signals and the corresponding weights) can be performed by the nodes. The result of the addition can be used in an activation function to determine whether the corresponding node will provide a signal to each of the nodes to which the corresponding node is coupled.

The ANNs 228 can be represented by instructions 236, which, according to the present disclosure, are compiled together to deploy the ANNs 228 on the DLA 226 as a single workload. Although the ANNs 228 are deployed on the DLA 226, the backing data for the ANNs 228 can be stored in the memory 210. The priority information 238 can represent a respective throughput for each of the ANNs 228, a relative portion of the available resources of the DLA 226 that are assigned to or used by each ANN 228, and/or a relative portion of execution time of the DLA 226 that is assigned to each ANN 228. The priority information 238 is a target that can be adjusted. In at least one embodiment, the priority information 238 can be adjusted by user input. In at least one embodiment, the priority information 238 can be adjusted automatically based on the respective input data 230 for each ANN 228. For example, the priority information 238 can be adjusted based on a relative volume of input data 230 for each ANN 228 (e.g., where a relatively greater quantity of input data 230-1 for a first ANN 228-1 yields a relatively higher priority information 238-1 for the first ANN 228-1).

The right side of FIG. 2 illustrates the DLA 226 using memory associated with the first ANN 228-1 during a first time 240-1. As the priority information 238 indicates that a time for a context switch is approaching, the DLA 226 can prefetch the weights 234-2 associated with the second ANN 238-2 at the second time 240-2. After prefetching the weights 234-2, the context switch from the first ANN 238-1 to the second ANN 238-2 can occur at a third time 240-3, after which, the DLA 226 uses memory associated with the second ANN 238-2 during a fourth time 240-4. Context switching is also referred to herein as changing from one execution schedule to another execution schedule, as described in more detail with respect to FIG. 3.

Figure 3:
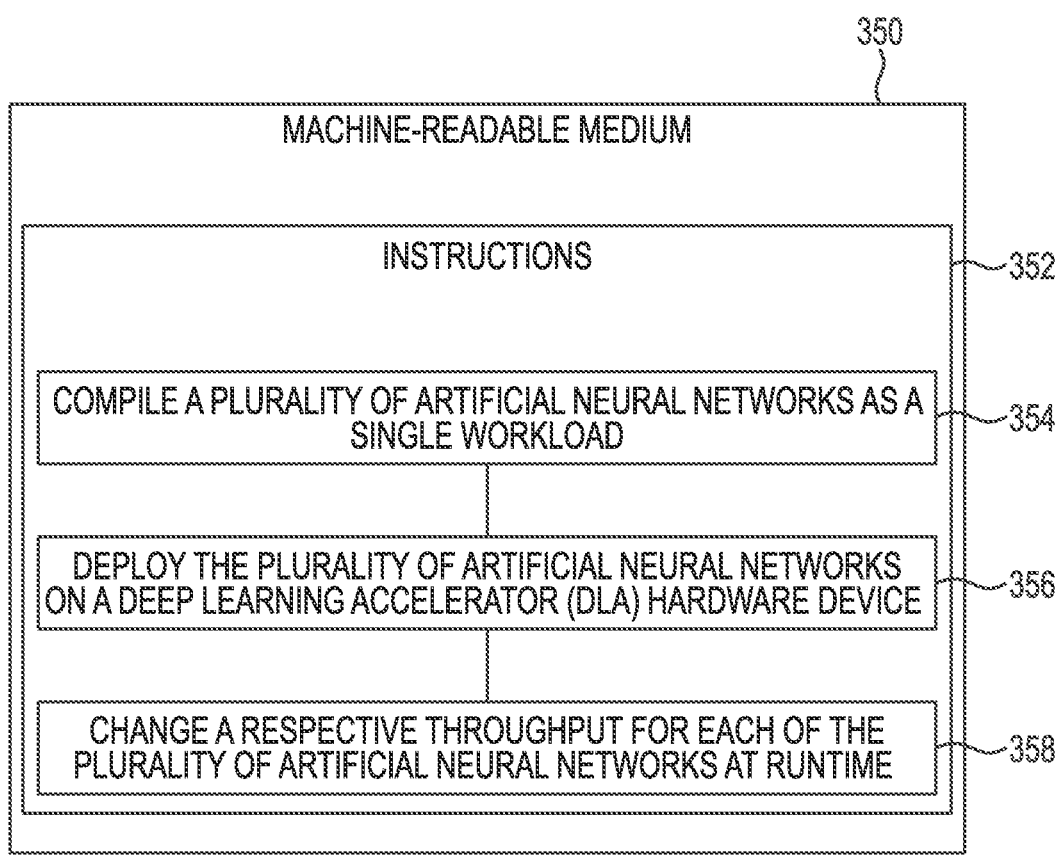
FIG. 3 is a diagram of a machine-readable medium including instructions to change the throughput of artificial neural networks at runtime in accordance with a number of embodiments of the present disclosure.

FIG. 3 is a diagram of a machine-readable medium 350 including instructions 352 to change the throughput of artificial neural networks at runtime in accordance with a number of embodiments of the present disclosure. The instructions 354 can be executed to compile a plurality (more than one) ANN as a single workload. As opposed to some previous approaches that compile each ANN as a separate workload (either for a general purpose processor or for a DLA hardware device), at least one embodiment of the present disclosure compiles multiple ANNs as a single workload so that the throughput for each ANN can be changed dynamically without recompiling and/or redeploying the ANNs. In some embodiments, because the multiple ANNs are compiled as a single workload, the DLA can execute both ANNs simultaneously. In some embodiments, although the multiple ANNs are compiled as a single workload, they may not be executed simultaneously by the DLA, or at least not executed simultaneously by the DLA all the time.

The instructions 356 can be executed to deploy the ANNs on a DLA hardware device. Deploying an ANN on the DLA can include providing instructions for execution of the ANN on the DLA to the DLA, providing weights for operation of the ANN on the DLA, providing inputs to the ANN to the DLA, and/or providing priority information for execution of the ANN (e.g., vis-à-vis other ANNs) to the DLA.

The instructions 358 can be executed to change a throughput for each of the ANNs at runtime. The throughput for each ANN can refer to a relative portion of the available resources of the DLA that are assigned to or used by each ANN and/or a relative portion of execution time of the DLA that is assigned to each ANN. The throughput can be adjusted, for example, by assigning a different portion of the compute resources of the DLA or a different relative portion of the execution time of the DLA to the ANNs. In at least one embodiment, the throughput can be changed based on data in an input pipeline. In at least one embodiment, the throughput can be changed based on a user specification or input. The throughputs for the ANNs can be changed without recompiling the ANNs.

Although not specifically illustrated, the instructions 352 can be executed to create execution schedules for the ANNs on the DLA hardware device. Each execution schedule can correspond to a respective distribution of the ANNs to the compute units of the DLA hardware device. An execution schedule can share at least one weight between at least two different ANNs. An execution schedule can share at least one layer between at least two different ANNs. The execution schedules can be stored in a low-level format, meaning that the execution schedules can be stored directly in a storage medium (e.g., the memory 210 illustrated in FIG. 2), bypassing a file system. In at least one embodiment, in order to effectuate changes in respective throughputs for different ANNs, an active execution schedule can be changed. For example, the DLA hardware device can execute the ANNs according to a first execution schedule and then subsequently execute the ANNs according to a second execution schedule, where the first and second execution schedules correspond to different distributions of the ANNs across the compute units of the DLA hardware device. In some instances, a particular execution schedule can be represented as a directed acyclic graph.

Figure 4:
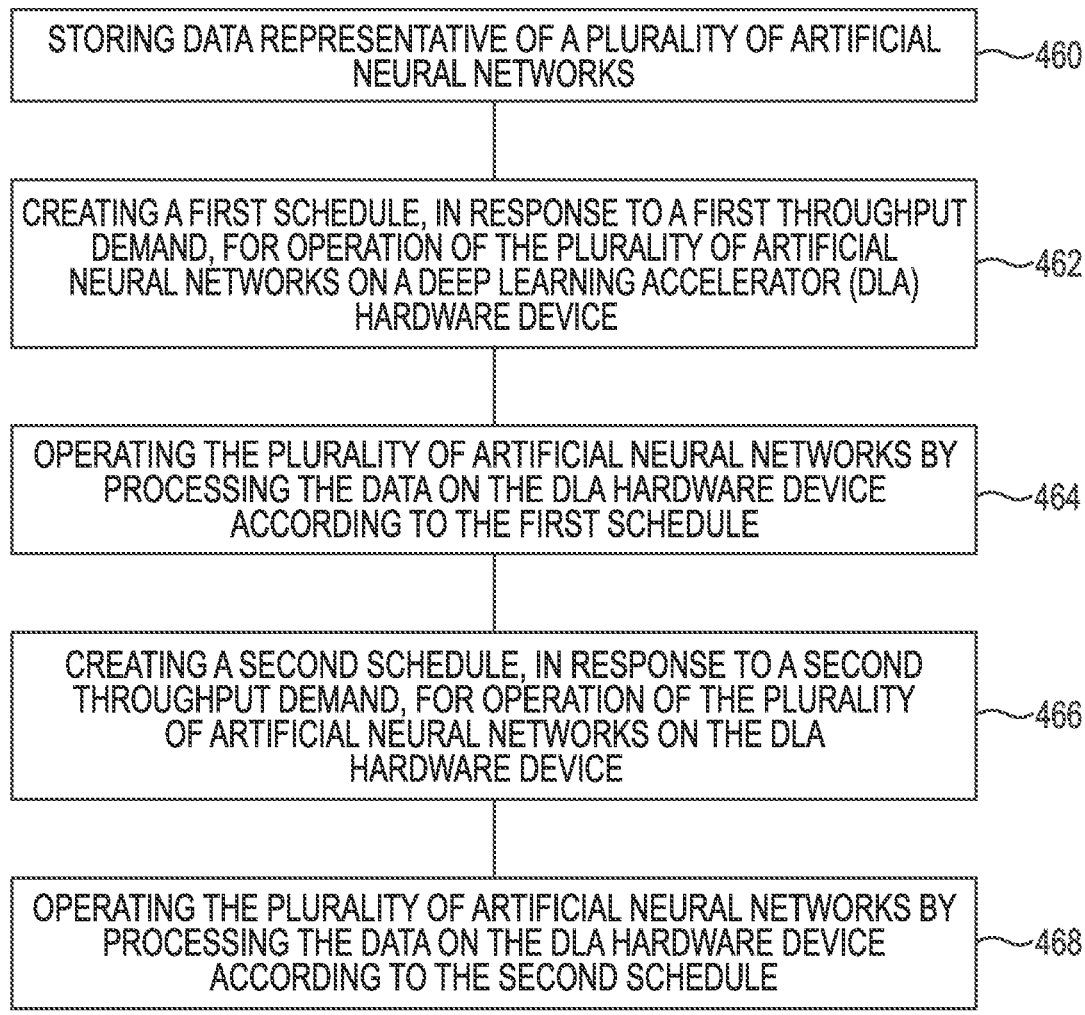
FIG. 4 is a flow diagram of a method for operating the plurality of artificial neural networks on a deep learning accelerator in accordance with a number of embodiments of the present disclosure.

FIG. 4 is a flow diagram of a method for operating the plurality of artificial neural networks on a deep learning accelerator in accordance with a number of embodiments of the present disclosure. The method can be performed by processing logic that can include hardware (e.g., a processing device, circuitry, dedicated logic, programmable logic, microcode, hardware of a device, integrated circuit, etc.), software (e.g., instructions run or executed on a processing device), or a combination thereof. In some embodiments, the method is performed by a host (e.g., host 102 illustrated in FIG. 1), by a memory device (e.g., the memory device 104 illustrated in FIG. 1) and/or by a DLA hardware device (e.g., the DLA hardware device 126 illustrated in FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 460, the method can include storing data representative of ANNs (e.g., partially compiled ANNs). The ANNs can be stored in a tangible machine-readable medium such as memory. In some embodiments, each of the ANNs can be partially compiled individually. Each ANN can be stored individually. Partially compiled means that the source code of the ANN has been translated into an intermediate form for later just-in-time compiling or later interpretation and execution. Just-in-time compiling is described in more detail below.

At block 462, the method can include creating a first execution schedule, in response to a first throughput demand, for operation of the ANNs on a DLA hardware device. At block 464, the method can include operating the ANNs by processing the data on the DLA hardware device according to the first execution schedule. The first execution schedule corresponds to a first distribution of the ANNs to compute units of the DLA hardware device. At block 466, the method can include creating a second execution schedule, in response to a second throughput demand, for operation of the ANNs on the DLA hardware device. The second execution schedule corresponds to a second distribution (different than the first distribution) of the ANNs to compute units of the DLA hardware device. At block 468, the method can include operating the ANNs by processing the data on the DLA hardware device according to the second execution schedule.

Creating the first execution schedule and/or creating the second execution schedule can include just-in-time compiling the ANNs. Just-in-time compiling the ANNs mean that they are compiled at runtime rather than before runtime during compile time. Compiling the ANNs just-in-time can advantageously allow for the ANNs to be tailored more narrowly to the dynamically changing throughput demands for each ANN. Although not specifically illustrated, the method can include determining the first throughput demand and the second throughput demand based on data in an input pipeline. For example, the first ANN can be configured to operate on data input from a first source and the second ANN can be configured to operate on data input from a second source. The first and second sources can provide different and/or variable amounts of data at different times. Alternatively or additionally, the method can include determining the first throughput demand and the second throughput demand based on user input. The user input can be a predefined value or a real-time input from the user. The user input can define a relative proportion of the compute resources and/or compute time of the DLA hardware device that is dedicated to execution of each ANN. Embodiments are not limited to the use of two ANNs as embodiments can include more than two ANNs simultaneously being deployed on a DLA hardware device.

Figure 5:
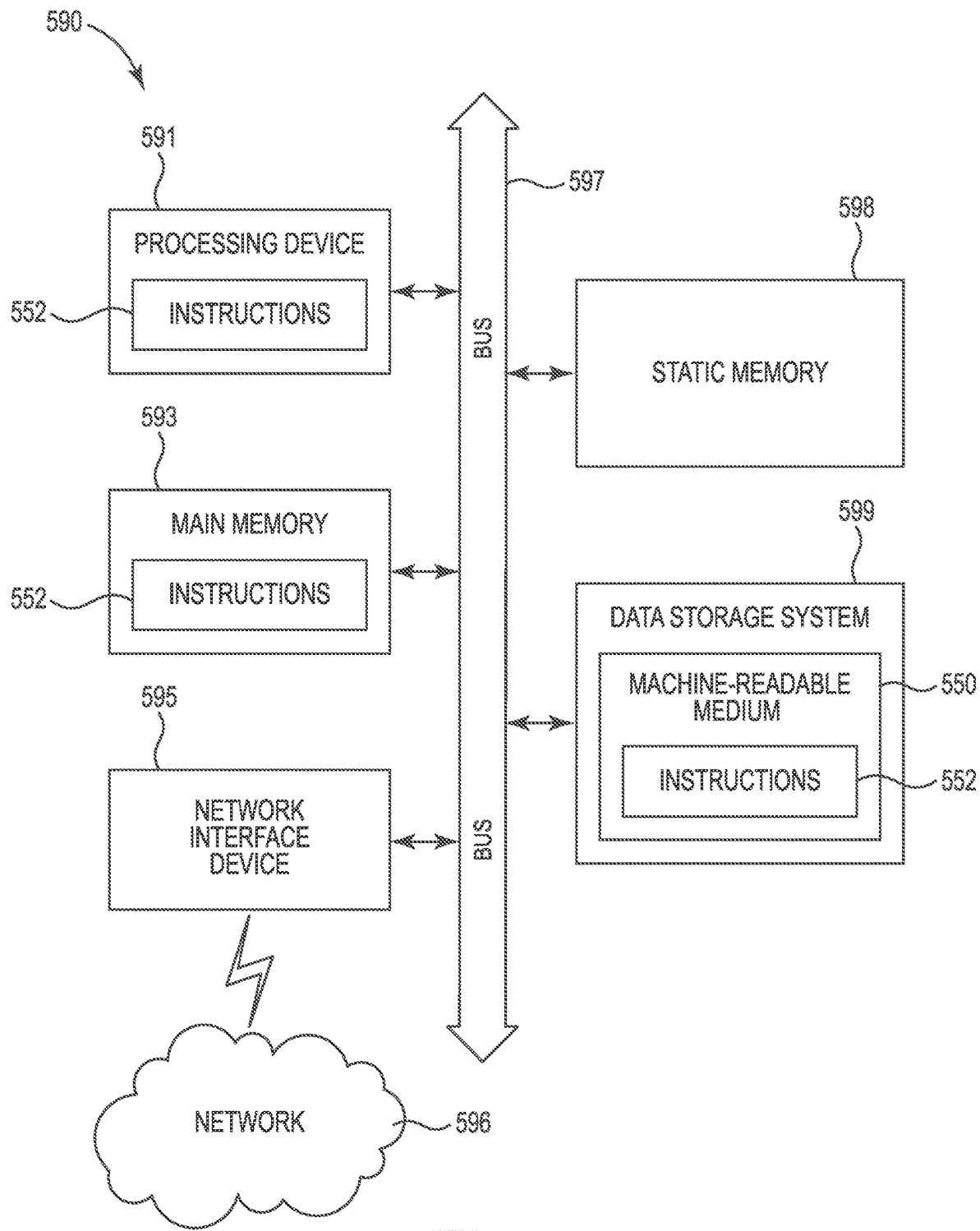
FIG. 5 illustrates an example computer system within which a set of instructions, for causing the machine to perform various methodologies discussed herein, can be executed.

FIG. 5 illustrates an example computer system within which a set of instructions, for causing a machine to perform various methodologies discussed herein, can be executed. In various embodiments, the computer system 590 can correspond to a system (e.g., the computing system 100 of FIG. 1) that includes, is coupled to, or utilizes a memory subsystem (e.g., the memory device 104 of FIG. 1) or can be used to perform the operations of control circuitry. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 590 includes a processing device 591, a main memory 593 (e.g., read-only memory (ROM), flash memory, dynamic random access memory (DRAM) such as synchronous DRAM (SDRAM) or Rambus DRAM (RDRAM), etc.), a static memory 597 (e.g., flash memory, static random access memory (SRAM), etc.), and a data storage system 599, which communicate with each other via a bus 597.

The processing device 591 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 591 can also be one or more special-purpose processing devices such as an application specific integrated circuit (ASIC), a field programmable gate array (FPGA), a digital signal processor (DSP), network processor, or the like. The processing device 591 is configured to execute instructions 552 for performing the operations and steps discussed herein. The computer system 590 can further include a network interface device 595 to communicate over the network 596.

The data storage system 599 can include a machine-readable storage medium 550 (also known as a computer-readable medium) on which is stored one or more sets of instructions 552 or software embodying any one or more of the methodologies or functions described herein. The instructions 552 can also reside, completely or at least partially, within the main memory 593 and/or within the processing device 591 during execution thereof by the computer system 590, the main memory 593 and the processing device 591 also constituting machine-readable storage media.

The instructions 552 can be analogous to the instructions 352 illustrated in FIG. 3. However, the instructions 552 can be different instructions to carry out any of the embodiments described herein. In at least one embodiment, the instructions 552 include instructions to implement functionality corresponding to the host 102, the memory device 104, the DLA hardware device 126, and/or the ANNs 128 of FIG. 1.

While the machine-readable storage medium 550 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

FIG. 6 is a block diagram of a fog computing network in accordance with a number of embodiments of the present disclosure. The fog computing network includes a plurality of sensors, such as the sensors 670-1, 670-2, . . . , 670-N coupled to the fog computing node 672-1. Additional sensors (although not specifically enumerated) are coupled to different fog computing nodes 672-2, . . . , 672-M. Non-limiting examples of sensors 670 include cameras, thermometers, antennas, etc. The sensors 670 generate data and transmit the data to the fog computing node 672 coupled thereto. The sensors 670 can be coupled to the fog computing nodes 672 in a wired or wireless manner.

The first fog computing node 672-1 includes a memory device 604-1 and a DLA hardware device 626-1. The second fog computing node 672-2 includes a memory device 604-2 and a DLA hardware device 626-2. The fog computing node 672-M includes a memory device 604-M and a DLA hardware device 626-M. The DLA hardware devices 626 can be integrated with the memory devices 604 in respective single packages as a component thereof. The DLA hardware devices 626 can be external to the memory devices 604 (on a separate chip). Although not specifically illustrated, in some embodiments, the fog computing nodes 672 can include additional processing resources. The DLA hardware devices 626 can have more than one artificial neural network compiled as a single workload and deployed thereon, as described herein.

A DLA hardware device 626-1 can be configured to operate a first artificial neural network based on data from a first sensor 670-1 and to operate a second artificial neural network based on data from a second sensor 670-2. The DLA hardware device 626-1 can be configured to operate the first and the second artificial neural networks according to a first schedule in response to the first sensor 670-1 providing a greater quantity of data than the second sensor 670-2 over a period of time. The DLA hardware device 626-1 can be configured to operate the first and the second artificial neural networks according to a second schedule in response to the second sensor 670-2 providing a greater quantity of data than the first sensor 670-1 over the period of time.

The fog computing nodes 672 are coupled to a fog computing server 674, which includes processing resources 691 and memory resources 693. The fog computing server 674 can be configured to execute a surveillance application using data received from the fog computing nodes 672. For example, the surveillance application can function to track the location of mobile devices, automobiles, people, etc., among other surveillance applications.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium having computer-readable instructions, which when executed by a machine, cause the machine to:
   compile a plurality of artificial neural networks (ANNs) as a single workload;
   deploy the plurality of ANNs as the single workload on a deep learning accelerator (DLA) hardware device;
   execute the plurality of ANNs as the single workload on the DLA hardware device according to a first execution schedule; and
   change a respective throughput for each of the plurality of ANNs during the execution without recompiling and redeploying the plurality of ANNs.

2. The medium of claim 1, further comprising instructions to change the respective throughput based on data in an input pipeline associated with the plurality of ANNs.

3. The medium of claim 1, further comprising instructions to change the respective throughput based on a user specification.

4. The medium of claim 1, wherein the DLA hardware device is an application specific integrated circuit (ASIC) or a field programmable gate array (FPGA).

5. The medium of claim 1, further comprising instructions to store a plurality of execution schedules for the plurality of ANNs on a memory device that includes the DLA hardware device.

6. The medium of claim 5, wherein each execution schedule corresponds to a respective distribution of the plurality of ANNs to a plurality of compute units of the DLA hardware device.

7. The medium of claim 5, wherein at least one execution schedule shares at least one weight between at least two of the plurality of ANNs.

8. The medium of claim 5, wherein at least one execution schedule shares at least one layer of nodes between at least two of the plurality of ANNs.

9. The medium of claim 5, further comprising instructions to store the plurality of execution schedules directly in a memory array of the memory device while bypassing a file system.

10. The medium of claim 5, wherein the instructions to change the respective throughput comprise instructions to operate the DLA hardware device according to a second execution schedule of the plurality of execution schedules after operating the DLA hardware device according to the first execution schedule of the plurality of execution schedules.

11. A method, comprising:
    storing data representative of a plurality of artificial neural networks (ANNs);
    storing a first execution schedule, in response to a first throughput demand, for execution of the plurality of ANNs on a deep learning accelerator (DLA) hardware device;
    executing the plurality of ANNs with the data on the DLA hardware device according to the first execution schedule;
    storing a second execution schedule, in response to a second throughput demand, for execution of the plurality of ANNs on the DLA hardware device; and
    executing the plurality of ANNs with the data on the DLA hardware device according to the second execution schedule;
    wherein the first execution schedule corresponds to first a first distribution and the second execution schedule corresponds to a second distribution of the plurality of ANNs to a plurality of compute units of the DLA hardware device.

12. The method of claim 11, wherein the plurality of ANNs comprise a plurality of partially compiled ANNs; and wherein the method further comprises just-in-time compiling the data representative of the plurality of ANNs.

13. The method of claim 11, wherein the first throughput demand and the second throughput demand are based on data in an input pipeline associated with the plurality of ANNs.

14. The method of claim 11, wherein the first throughput demand and the second throughput demand are based on user input.

15. An apparatus, comprising:
a memory array; and
a deep learning accelerator (DLA) hardware device coupled to the memory array, wherein the DLA hardware device is configured to:
   access a first execution schedule form the memory array;
   execute a plurality of artificial neural networks (ANNs) deployed on the DLA hardware device according to the first execution schedule, wherein compute resources of the DLA hardware device are shared among the plurality of ANNs during the execution according to the first execution schedule;
   access a second execution schedule from the memory array;
   execute the plurality of ANNs according to the second execution schedule without having the ANNs redeployed on the DLA hardware device, wherein compute resources of the DLA hardware device are shared differently among the plurality of ANNs during the execution according to the second execution schedule relative to the first execution schedule.

16. The apparatus of claim 15, wherein the DLA hardware device is configured to prefetch weights associated with a second ANN from the memory array while executing a first ANN of the plurality of ANNs.

17. The apparatus of claim 16, wherein the DLA hardware device is configured to prefetch the weights according to an upcoming context switch from the first ANN to the second ANN as indicated by the first execution schedule.

18. The apparatus of claim 15, wherein the compute resources are shared differently between the plurality of ANNs according to any of a plurality of execution schedules accessed from the memory array.

19. The apparatus of claim 18, wherein the DLA hardware device is an application specific integrated circuit (ASIC) or a field programmable gate array (FPGA).

20. A system, comprising:
a first sensor;
a second sensor;
a deep learning accelerator (DLA) hardware device; and
a memory device coupled to the first and the second sensors and to the DLA hardware device, wherein a first artificial neural network (ANN) and a second ANN compiled as a single workload are deployed on the DLA hardware device;
wherein the DLA hardware device is configured to:
   execute the first ANN based on data produced from the first sensor;
   execute the second ANN based on data produced from the second sensor;
   execute the first and the second ANN according to a first execution schedule in response the first sensor producing a greater quantity of data than the second sensor over a period of time; and
   execute the first and the second ANN according to a second execution schedule in response to the second sensor producing a greater quantity of data than the first second sensor over the period of time.

21. The system of claim 20, wherein the DLA hardware device is a component of the memory device.

22. The system of claim 20, wherein the DLA hardware device comprises an application specific integrated circuit (ASIC).

23. The system of claim 20, wherein the DLA hardware device comprises a field programmable gate array (FPGA).

24. The system of claim 20, wherein the first sensor, the second sensor, and the memory device comprise a fog computing node; and
   wherein the system further comprises:
      a plurality of fog computing nodes; and
   a server coupled to the plurality of fog computing nodes, wherein the server is configured to execute a surveillance application using data received from the plurality of fog computing nodes.

* * * * *